United States Patent [19]
Licht

[11] Patent Number: 4,828,942
[45] Date of Patent: May 9, 1989

[54] POLYSULFIDE BATTERY

[75] Inventor: Stuart Licht, Lexington, Mass. 02173

[73] Assignee: Massachusetts Institute of Technology, Cambridge, Mass.

[21] Appl. No.: 90,052

[22] Filed: Aug. 27, 1987

[51] Int. Cl.$^4$ .................. H01M 4/36; H01M 10/36
[52] U.S. Cl. .................................. 429/50; 429/105
[58] Field of Search .................................. 429/105, 50

[56]  References Cited

U.S. PATENT DOCUMENTS

| | | | |
|---|---|---|---|
| 4,064,326 | 12/1977 | Manassen et al. | 429/111 |
| 4,421,835 | 12/1983 | Manassen et al. | 429/111 |
| 4,485,154 | 11/1984 | Remick et al. | 429/105 |

OTHER PUBLICATIONS

Sudworth, J. Power Sources, 11:143, (1984).
Manassen et al., J. Electrochemical Soc., 124(4):532–534, (1977).
Licht and Manassen, J. Electrochemical Soc., 134:1064, (1987).
Hodes & Manassen, J. Electrochemical Soc., 127(3):544–549, (1980).
Licht et al. (I), J. Electrochemical Soc., 133(2):272–277, (1986).
Licht et al. (II), J. Electrochemical Soc., 133(2):277–280, (1986).
Licht et al. (III), Inorg. Chem., 25:2486–2489, (1986).
Licht et al. (IV), Nature, 326:863–4, (1987).

Primary Examiner—Donald L. Walton

[57]  ABSTRACT

A half-cell of an electric storage cell comprises an electrocatalytic electrode immersed in an aqueous salt solution of potassium and/or other polysulfide anions in high concentration so that the sulfur species which may be electrochemically oxidized or reduced form substantial components of the solution (e.g. at least 20% by weight). $Na^+$ and $OH^-$ salts which limit polysulfide solubility and/or solution stability are not added to the salt solution. Aqueous $KS_x^{-2}$ in the storage cell contains up to 24.5 molal reducible sulfur at 25° C., and up to 34.2 molal reducible sulfur in solution at 70° C. This high faradaic capacity is readily accessible at high current density with minimal polarization losses.

23 Claims, 3 Drawing Sheets

POLYSULFIDE BATTERY

BACKGROUND OF THE INVENTION

This invention relates to electrical storage cells.

There is an ongoing need for improved electrical storage batteries, particularly practical, low-cost, high energy-density, secondary batteries (i.e., rechargeable batteries). Serious electrochemical, economic or environmental constraints are imposed on the choice of battery materials.

High temperature molten alkali sulfide batteries have been investigated, however, problems limit the system's practicality, including those associated with the high operating temperatures necessary to maintain liquid phase alkali polysulfides, solid electrode degradation, electrical insulation, passivation by sulfur, and safety considerations. See, e.g., Sudworth, *J. Power Sources* 11:143 (1984).

Aqueous redox cells have the benefit of reduced material and safety constraints, and they operate in a highly conductive medium. An aqueous polysulfide redox half cell has been employed in solar cells for photoelectrochemical conversion and storage. For example, Manassen et al. U.S. Pat. No. 4,421,835 (2:44–55), Manassen et al. U.S. Pat. No. 4,064,326 (8:41 and 10:35–37), and Manassen et al. (1977) *J. Electrochemical Soc.* 124(4):532–534 disclose such systems in which the aqueous polysulfide solution comprises, e.g. 2M KOH, 2M $Na_2S$, and 2MS, or 6N KOH, 0.5M $Na_2S$, and 0.5M S. These cells exhibit a relatively low faradaic capacity. See, e.g., Licht and Manassen, *J. Electrochem. Soc.* 134:1064(1987).

SUMMARY OF THE INVENTION

One aspect of the invention generally features a half-cell of an electrical storage cell comprising an aqueous salt solution of polysulfide anions in high concentration, so that the sulfur in the solution forms a substantial component of the solution (e.g. at least 20% by weight).

In a second aspect, the $Na^+$ and $OH^-$ ion concentrations are low enough that they effectively do not limit the concentrations of polysulfide anions. Solubility of $NaS_x^{-2}$ at room temperature is relatively low, about 3 molal, and that solubility is further reduced with the addition of $OH^-$. Moreover, $OH^-$ ions alter the composition of the mixture of sulfide species in a manner that is unfavorable for overall cell performance. Specifically, added $OH^-$ limits sulfide and polysulfide solubility and diminishes solution stability. Accordingly no $OH^-$ is added to the solution.

Preferred embodiments include the following features. Sulfur contained in the polysulfide solution forms at least 20% (most preferably at least 30–45%) by weight of the solution. At the maximum concetrations, these solutions can contain more sulfur by weight than water. $Cs^+$, $NH_4^+$ and/or, most preferably, $K^+$ cations are present in the solution in a concentration at least about double the polysulfide anion concentration. Aqueous $K_2S_4$ contains up to 20.4, 25.5, and 33.4 molal reducible sulfur, respectively, at 0° C., 25° C., and 50° C., corresponding respectively to concentrations of 58%, 64%, and 70% $K_2S_4$ by weight. Even higher effective concentrations can be utilized by maintaining excess solid in contact with a saturated solution. The maximum storage capacity of $K_2S_4$ is given by:

$$\text{storage capacity} = \frac{\text{mole } K_2S_4}{0.20646 \text{ kg}} \cdot \frac{6 \text{ faraday}}{\text{mole } K_2S_4} \cdot \frac{96500 C}{\text{faraday}}$$

$$\text{storage capacity} = 2.8 \times 10^6 \text{ C/kg}$$

This is approximately three times the storage capacity of lead/metal based storage systems. $K_2S$ has a solubility of 49% by weight at 25° C., compared to a solubility for $Cs_2S$ of greater than 60% by weight at 0°–25° C. $(NH_4)_2S$ is also very soluble.

Other preferred features are as follows. The current transferring electrode is a thin-film electrode, e.g. one comprising a metal sulfide such as cobalt sulfide. The other half-cell comprises a second current transferring electrode and a redox species effective to generate a substantial voltage difference between the half-cells; the cell further includes means (e.g. a membrane, particularly a sulfonated polymeric membrane) to effect ion current transfer between the redox species and the polysulfide solution, while impeding transfer of at least some ionic species, particularly chemically reactive species. Specifically, the membrane maintains a high sulfur species concentration differential between the two half cells.

The redox species of the half-cell complementing the above described polysulfide cell can be confined in various media, for example, multi-phase media, aqueous media, non-aqueous liquid media, solid electrolyte media, or polymer media. Redox active polymers can be used. Redox metal reactions also can be used, such as: tin/tin sulfide; zinc/zinc sulfide or hydroxide; selenide/selenium; telluride/tellurium; Ni/NiOH; Hg/HgS; $Ag/Ag_2S$; or $Fe/Fe_2S_3$.

One satisfactory complementary half-cell is an aqueous salt solution of hydrosulfide/hydroxide, of at least 15% hydrosulfide by weight, with a current transferring electrode in contact with that solution. KHS has a solubility of about 60% by weight at 25° C. CsHS has a solubility greater than about 60% by weight at 0°–25° C., $NH_4HS$ has a solubility to 56% at 0° C.

The above-described hydrosulfide/hydroxide solution serves generally as an electron-generating redox species. Accordingly, in a third aspect, the invention generally features an electrical storage cell, one half-cell of which comprises a current-transferring electrode in electron-transferring contact with an aqueous salt solution comprising hydrosulfide and hydroxide anions, the hydrosulfide ions being present at a concentration of at least 15% by weight.

Finally, in a fourth aspect, the invention generally features a method of generating a direct current between two contact points by: (a) providing an aqueous solution comprising polysulfide anions, the concentration of the polysulfide anions being sufficient that the sulfur atoms of the polysulfide anions form a substantial component of the solution; (b) positioning a solid electrode in electron-transferring contact with the aqueous solution and the first contact point; (c) providing a redox couple complementary to the polysulfide anions, positioned in ion-current transferring contact with the aqueous solution and in electron transferring contact with the second contact point; and (d) establishing electrical contact between the contact points.

Preferably the solution comprises $Cs^+$, $NH_4^+$ and/or (most preferably) $K^+$ in a concentrations at least about twice the polysulfide anion concentration.

The extraordinarily high concentrations of polysulfide ions maintained in the conductive aqueous environment of the above-described cell, and the avoidance of undesirable conditions that either could limit that concentration or could unfavorably alter the composition or stability of sulfide species, enables a high density, relatively light-weight, secondary battery. Relying solely on the concentration gradient provided by complementary polysulfide and sulfide half-cells (i.e., without relying on increased potential difference available by selecting heterogeneous redox species), a voltage differential on the order of hundreds of millivolts is achieved. The current density achieved is extraordinarily high and the Faraday weight ratio is also very high. Moreover, the raw material (sulfur) is relatively abundant and inexpensive.

Other features and advantages are apparent from the following description of the preferred embodiment and from the claims.

DESCRIPTION OF THE PREFERRED EMBODIMENT

Apparatus

Figure 1:
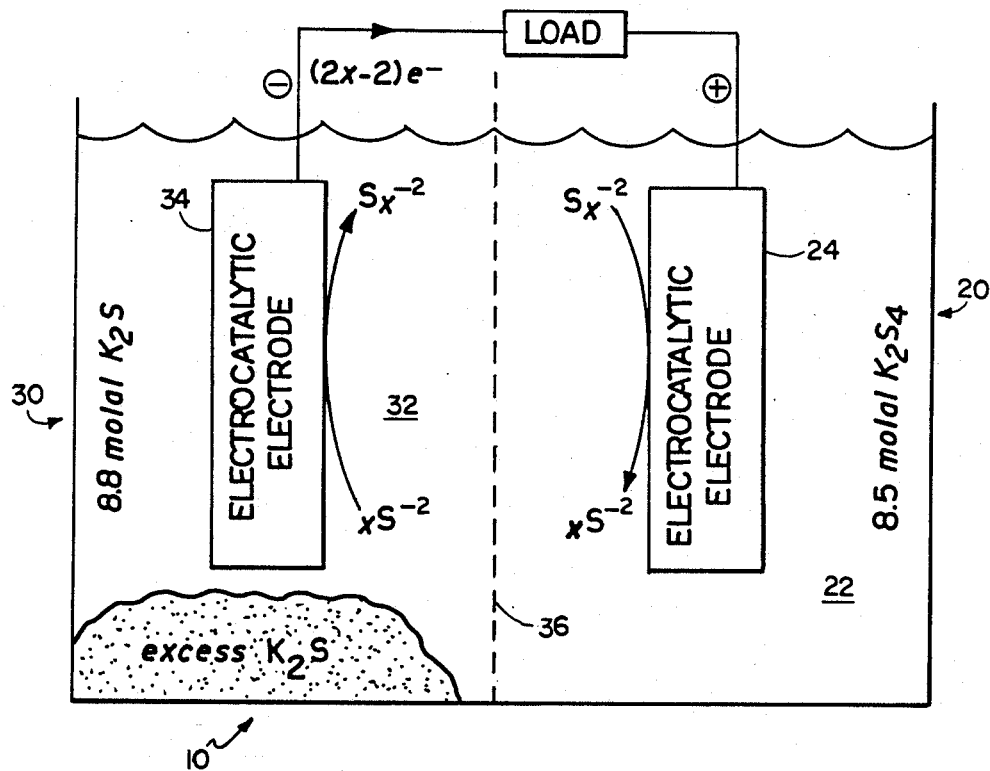
FIGS. 1 is a highly diagrammatic representation of an electrical storage cell.

In FIG. 1, cell 10 is a diagrammatic representation of an electrochemical cell based on a polysulfide/sulfide redox couple. Specifically, half-cell 20 of cell 10 includes an aqueous solution 22 in contact with an electrocatalytic electrode 24. Reduction of $S_x^{-2}$ anions to $S^{-2}$ anions is achieved via electrons available from electrode 24.

More specifically, solution 22 is a concentrated solution of potassium polysulfide. Without being bound to any theory, it appears that, in aqueous solution, polysulfides are in a complex equibrium of $HS^-$, $S^{-2}$, $S_2^{-2}$, $S_3^{-2}$, $S_4^{-2}$, $S_5^{-2}$, $H^+$, $OH^-$ and $H_2O$. It also appears that most of the sulfur to be reduced is present as $S_4^{-2}$ and the active redox species is $S_2^-$. See, generally, Licht et al. *Inorg. Chem.* 25:2486 (1986); and Lessner et al. *J. Electrochem. Soc.* 133:2517 (1986). However, these theoretical considerations are not essential to the ability to practice the invention, and the invention does not depend on them.

Solution 22 may be prepared by first preparing concentrated aqueous potassium hydrosulfide, according to the following reaction:

Specifically, cooled, stirred analytical grade KOH solution is saturated with $H_2S$. The reaction proceedes 98% to completion.

The KHS product is converted (essentially) to potassium tetrasulfide by adding KOH and sulfur.

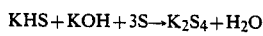

An electrocatalytic electrode is placed in contact with the solution. For example, a thin film cobalt sulfide electrode can be produced by electrodeposition of cobalt onto brassfoil followed by alternating anodic and cathodic treatments in polysulfide solution. A copper sulfide electrode can be similarly prepared. The overpotential at the electrode is further reduced by the use of $K^+$ or $Cs^+$ electrolyte.

The above described half-cell is coupled to a complimentary half-cell to provide a complete circuit. The complimentary half-cell can include any of a wide variety of electroactive species.

Specifically, in FIG. 1, half cell 30 includes a cobalt sulfide electrode 34 in an aqueous solution 32 of $K_2S$. The two electrodes are separated by a polysulfide-inhibiting barrier, such as a sulfonated polymeric membrane 36 that is selectively permeable to cations such as a Permion 1010 sulfonated styrene and Teflon ® copolymer membrane sold by Permiar of New York. The membrane is cation selective and has a rated electrical resistance of $0.2\Omega/cm^2$. A sulfonated polyethylene membrane can also be used; such membranes have a resistance of about $1-2\Omega/cm^2$. Due to the extremely high osmotic forces on the membrane, a mesh can be included to support the membrane.

The following specific examples are provided to illustrate the invention, and not by way of limitation.

EXAMPLE 1

The theoretical faradaic capacity of cell 10 shown in FIG. 1 is 51.0 Faraday/kg $H_2O$, when 8.8 molal $K_2S$ with excess solid $K_2S$ is oxidized to 8.5 molal $K_2S_4$.

The polysulfide redox potential of cell 10 and galvanostatic reduction potential were measured at 25° C., versus a double junction standard calamel electrode sandwiched between a 400μm open mesh separator with a Permion 1010 membrane on either side of the mesh. The half-cell is a thin cell of 0.5 cc capacity with a 10 cm² cobalt sulfide working electrode.

Figure 2:
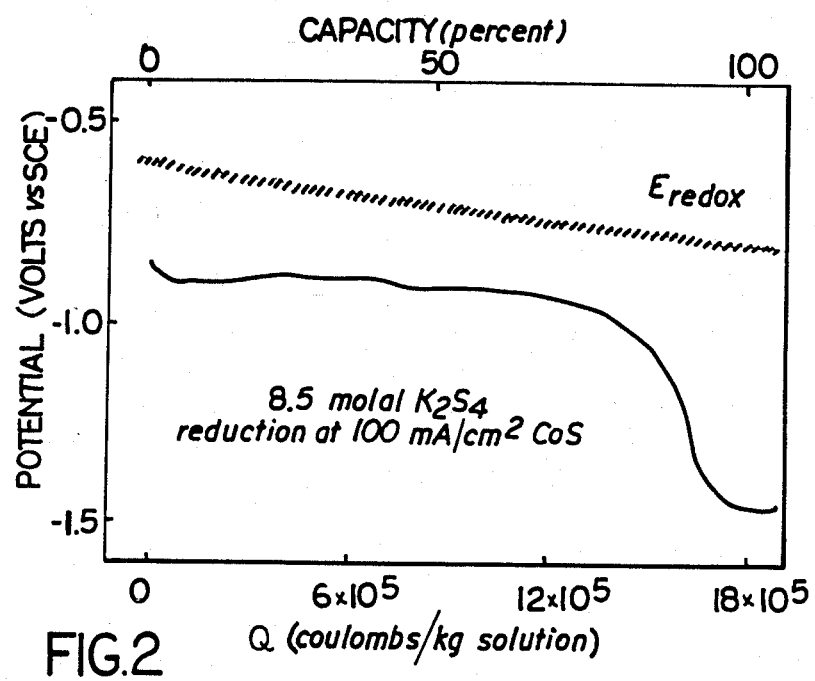

The graph of FIG. 2 depicts the resulting voltage as a function of charge per weight of solution. FIG. 2, the measured redox potential of cell 10 ($E_{redox}$) is shown as a dotted line. Essentially 90–100% of the theoretical reduction capacity of cell 10 was accessed as shown by the solid line in FIG. 2.

EXAMPLE 2

Figure 3:
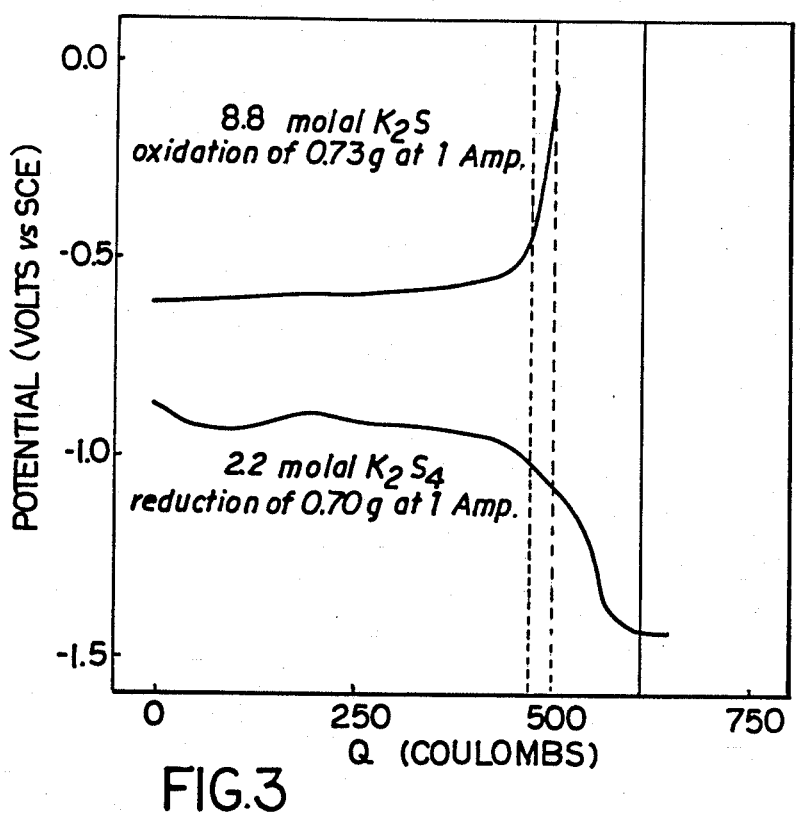
FIGS. 2–5 are graphs described in the examples below.

Further demonstration of essentially complete access to the faradaic storage capacity of a saturated $K_2S$ aqueous redox half-cell is provided in FIG. 3. The top curve of FIG. 3 represents galvanostatic oxidation of 0.73 g of 8.8 m (saturated) $K_2S$ electrolyte. The dotted vertical line represents the theoretical capacity assuming a $K_2S_4$ end product, while the dashed vertical line assumes a $K_2S_5$ end product.

The lower curve represents galvanostatic reduction of 0.70 g of 2.2 m $K_2S_4$ compared to 100% theoretical capacity (solid vertical line).

EXAMPLE 3

Figure 4:
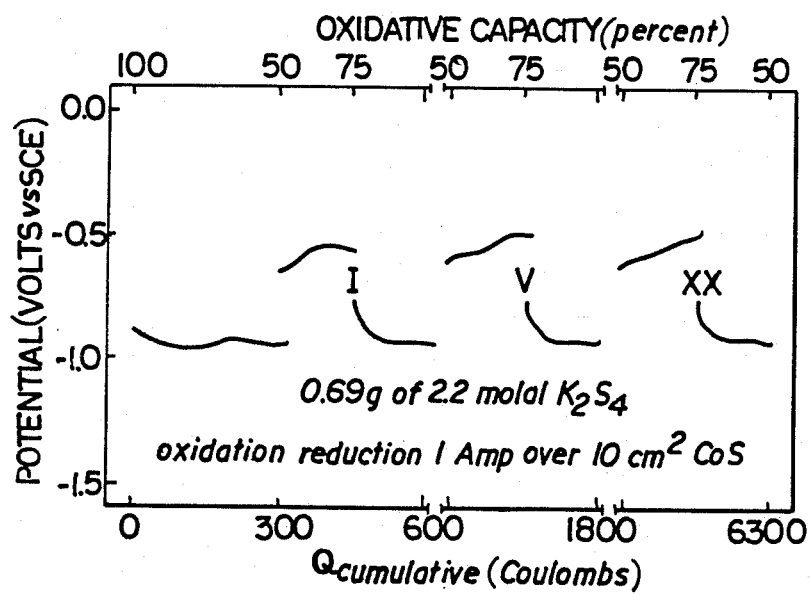

A demonstration of the recycling capability (rechargeability) of a polysulfide redox half-cell is shown in FIG. 4 containing 0.69 g of 2.2 m $K_2S_4$ was initially reduced to 50% of theoretical capacity of 600 coulombs, and cycled from 50% to 75% of oxidative capacity through a thin-film cobalt sulfide electrode. The first, fifth and twentieth oxidation cycles are presented. Q refers to total current passed through the cell.

EXAMPLE 4

Figure 5:
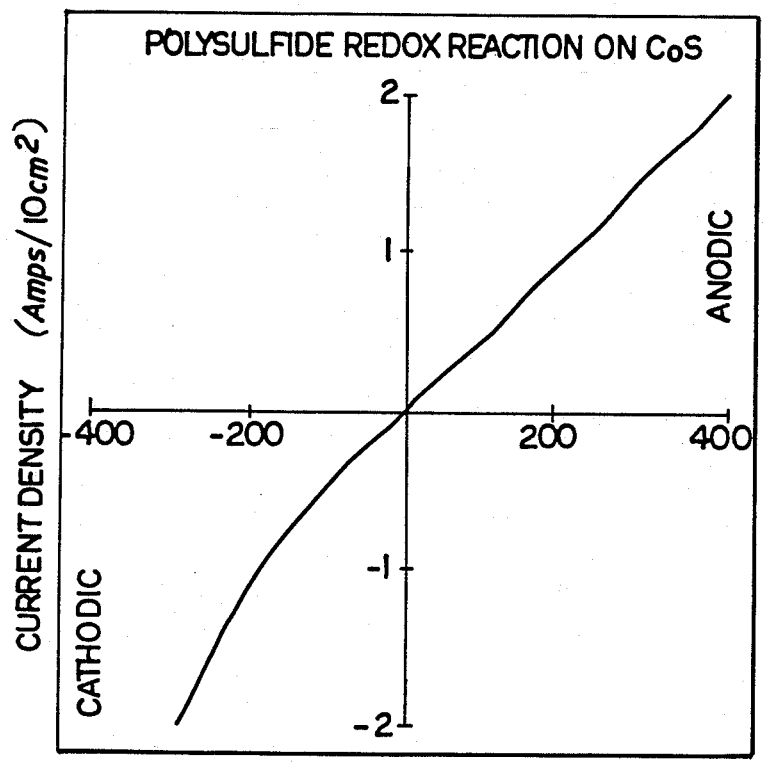

FIG. 5 illustrates rapid accessibility to and, minimal polarization losses associated with the high faradaic capacity stored in the polysulfide cell—e.g., aqueous polysulfide in a solution containing 4.4 m sulfur and 4.4 m $K_2S$ at 25° C. through a 10 cm² thin film cobalt sulfide electrode. Activity of the electrode remained stable; the measured overpotential remained at less than 2 mV cm$^2$/mA in the polysulfide electrolyte, after the exchange of $10^4$C of oxidative reductive charge through the electrode. Current densities greater than 1 amp/10 cm$^2$ were generated with polarization losses less than 2 millivolt cm$^2$/milliamp.

Other embodiments are within the following claims.

I claim:

1. An electrical storage cell comprising two electrochemical half cells positioned in electrochemical contact with each other, at least one of said half cells comprising:
   (a) an aqueous salt solution comprising polysulfide anions, the concentration of Na$^+$ ions in said solution being low enough so that they effectively do not limit the concentration of said polysulfide anions, the solution comprising at least 20% sulfur by weight; and
   (b) a current-transferring electrode positioned in electron-transferring contact with said aqueous solution.

2. The electrical storage cell of claim 1 in which said aqueous salt solution comprises at least 30% sulfur by weight.

3. The electrical storage cell of claim 1 in which the second of said half cells comprises
   a second current-transferring electrode and
   a redox species, said redox species being effective to generate a substantial voltage difference between said half cells.

4. The electrical storage cell of claim 3 in which said second half-cell comprises a multi-phase redox couple.

5. The electrical storage cell of claim 3 in which said second half-cell comprises a redox species confined in a medium selected from the group consisting of aqueous, non-aqueous liquids, solid electrolyte, and polymeric media.

6. The electrical storage cell of claim 3 wherein said redox species is a redox active polymer.

7. The electrical storage cell of claim 3 wherein said redox species comprises a redox active metal.

8. The electrical storage cell of claim 7 wherein said redox species comprises:
   (a) metal: metal chalcogenide;
   (b) metal: metal hydroxide; or
   (c) metal: metal oxide.

9. The electrical storage cell of claim 3 further comprising means to impede transfer of chemically reactive species between said solution and said redox species of said other half-cell.

10. The electrical storage cell of claim 9 in which said means to impede chemically reactive ion transfer comprises a membrane positioned to separate said first solution from said redox species.

11. The electrical storage cell of claim 10 in which said membrane is effective to maintain a high sulfur species concentration differential between said half cells.

12. The electrical storage cell of claim 10 in which said membrane passes ions to effect ion current transfer.

13. The electrical cell of claim 10 in which said membrane is a sulfonated polymeric membrane.

14. The electrical storage cell of claim 3 in which the second half-cell comprises
   (a) an aqueous salt solution comprising hydrosulfide anions and hydroxide anions, said hydrosulfide anions being present in said solution at a concentration of at least 15% by weight, and
   (b) a second current-transferring electrode in contact with said second aqueous salt solution.

15. An electrical storage cell comprising two electrochemical half cells positioned in electrochemical contact with each other, at least one of said half cells comprising:
   (a) an aqueous salt solution comprising polysulfide anions, the concentration of said polysulfide anions being sufficient that the sulfur contained in said solution forms a substantial component of said solution; and
   (b) a current-transferring electrode positioned in electron-transferring contact with said aqueous solution.

16. The electrical storage cell of claim 1 or claim 15 further characterized in that said solution comprises a cation selected from the group consisting of K$^+$ ions, Cs$^+$ ions, and NH$_4^+$ ions in a concentration at least about twice said polysulfide anion concentration.

17. The electrical storage cell of claim 16 in which said cation is K$^+$.

18. The electrical storage cell of claim 1 or claim 15 in which the electrode comprises a thin film electrode.

19. The electrical storage cell of claim 18 in which the electrode comprises a metal sulfide.

20. An electrical storage cell comprising two electrochemical half cells positioned in electrochemical contact with each other, at least one of said half cells comprising:
   (a) an aqueous salt solution comprising hydrosulfide and hydroxide anions, said hydrosulfide ions being present in said solution at a concentration of at least 15% by weight; and
   (b) a current-transferring electrode positioned in electron-transferring contact with said aqueous solution.

21. A method of generating a direct current between a first contact point a second contact point comprising:
   (a) providing an aqueous salt solution comprising polysulfide anions, said solution comprising at least 20% sulfur by weight;
   (b) positioning a solid electrode in electron-transferring contact with the aqueous solution and said first contact point;
   (c) providing a redox couple complementary to said polysulfide and sulfide anions, positioned in ion-current transferring contact with said aqueous solution and in electron transferring contact with said second contact point; and
   (d) establishing electrical contact between said first contact point and said second contact point;
   whereby said polysulfide anions are oxidized or reduced, generating an electrical current and potential between said first contact point and said second contact point.

22. The method of claim 21 in which said solution comprises a cation selected from the group consisting of K$^+$ ions, Cs$^+$ ions, and NH$_4^+$ ions is a concentration substantially double said polysulfide anion concentration.

23. The method of claim 22 in which said solution comprises K$^+$ ions.

* * * * *